(12) United States Patent
van Welzen et al.

(10) Patent No.: US 12,005,363 B2
(45) Date of Patent: Jun. 11, 2024

(54) CLOUD EXECUTION OF AUDIO/VIDEO COMPOSITING APPLICATIONS

(71) Applicant: NVIDIA Corporation, Santa Clara, CA (US)

(72) Inventors: James van Welzen, Sandy, UT (US); Amit Parikh, Santa Clara, CA (US); Jonathan White, Fort Collins, CO (US); Travis Muhlestein, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 132 days.

(21) Appl. No.: 17/231,423

(22) Filed: Apr. 15, 2021

(65) Prior Publication Data
US 2022/0331702 A1   Oct. 20, 2022

(51) Int. Cl.
*A63F 13/86*    (2014.01)
*A63F 13/335*   (2014.01)
*G06F 9/455*    (2018.01)

(52) U.S. Cl.
CPC ............ *A63F 13/86* (2014.09); *A63F 13/335* (2014.09); *G06F 9/45558* (2013.01); *G06F 2009/45595* (2013.01)

(58) Field of Classification Search
CPC ........ A63F 13/88; A63F 13/355; A63F 13/86; A63F 13/335; G06F 9/45558
See application file for complete search history.

(56) References Cited

U.S. PATENT DOCUMENTS

| 2016/0085348 A1* | 3/2016 | Krause | G06F 3/038 345/173 |
| 2017/0001111 A1* | 1/2017 | Willette | A63F 13/49 |
| 2022/0256253 A1* | 8/2022 | Lazar | H04N 21/8545 |

OTHER PUBLICATIONS

Wikipedia The Free Encyclopedia :Thin client, Retreived from (https://en.wikipedia.org/w/index.php?title=Thin_client&oldid=1006324321) on Apr. 12, 2023 Last Edited Feb. 12, 2021.*

* cited by examiner

*Primary Examiner* — David L Lewis
*Assistant Examiner* — Robert E Mosser
(74) *Attorney, Agent, or Firm* — Taylor English Duma L.L.P.

(57) ABSTRACT

In various examples, applications may be executed on remote computing devices to composite and broadcast gameplay with video and audio data. Systems and methods are disclosed that distribute, between and among various computing devices, processing of tasks including rendering of gameplay, composition of various types of data, and broadcasting of composited data. The tasks may be executed on computing devices that are remote to a client device, such as a virtual machine, GPU, server, and/or other computing device in the cloud, all of which are connected through a network. Customized composited content may be generated within the system, without latency and dropped frames, by distributing tasks such as compositing and rendering of gameplay to computing devices that have high performance capability and are specialized for handling memory- and time-intensive tasks.

27 Claims, 10 Drawing Sheets

CLOUD EXECUTION OF AUDIO/VIDEO COMPOSITING APPLICATIONS

BACKGROUND

As livestreaming gameplay of video games enhanced with sophisticated digital assets gains traction among a large audience of viewers online, users are spending an increasing amount of time customizing the viewing experience of their audiences. In order to accomplish this, users are often seeking to augment gameplay by compositing graphic design assets (e.g., stickers, digital graphics, custom logos, graphic design, avatars, gifs, memes, videos, chat conversations with other players, etc.) and other data (e.g., audio and video data of the user while the game is being played, livestreams of other players in the game session, etc.) with livestreaming gameplay. For example, a user may want to livestream gameplay of a popular game, while also including the user's logos along with audio and video streams of the user that are synchronized with gameplay to provide the user's reactions and comments in real-time. As the game is played and livestreamed, the user may want to adjust or toggle between one or more created layouts of the content being presented to a viewer (e.g., each layout has a different location of audio and video streams and/or assets). However, compositing multiple streams of data (e.g., via post-processing or compositing applications) along with executing a high-quality video game in real-time without dropping frames requires high bandwidth capacity, high performance computing resources, and large stores of memory space. Even if vast amounts of memory in the cloud are used, it is challenging to have adequate network resources to render gameplay, receive command control signals from the user, composite gameplay with other elements, and broadcast composited content to a broadcasting server. Without plentiful resources, compositing multiple sources of data can lead to latency, lag, dropped frames, and/or processor or memory capacity issues for users—thereby impacting the final broadcast to audiences and/or gameplay for the user. For example, because not all users have access to high performance computers, latency issues may arise when users attempt to participate in gameplay while also locally hosting a composited broadcast. As such, there is a discrepancy between the capability of many user devices to execute gaming, compositing, and/or broadcasting applications and the high level of quality and performance desired to provide a worthwhile experience for users and their audiences.

For example, conventional systems often leverage a local machine to execute gaming, compositing, and/or broadcasting applications. However, this methodology is problematic for a number of reasons. For instance, personal computing devices, which are less likely to be high performing, have limited ability to execute several applications that require high bandwidth while maintaining a low level of latency and a high level of quality in gameplay. Requiring each user to either use one or more personal computing devices at once or purchase computing devices with greater bandwidth and memory capacity is both costly and can present a prohibitive barrier to entry for many users. As a result, competing interests of cost and quality make implementing high quality live gameplay, compositing that gameplay with other data (e.g., audio and video data, graphic design assets), and broadcasting composited streaming data to a large audience with high synchronization and low latency increasingly onerous, especially when considering entities with a small pool of resources to begin with.

SUMMARY

Embodiments of the present disclosure relate to executing applications on remote computing devices to composite and broadcast—e.g., live—gameplay with video and audio data. Systems and methods are disclosed that distribute tasks, such as game rendering and composition of data, to one or more computing devices that are remote to a client device.

In contrast to the conventional systems, such as those described herein, the system and methods of the present disclosure offload rendering of gameplay and compositing of gameplay content—both of which are memory and time-intensive tasks—to remote computing devices (e.g., executing one or more virtual machines) to reduce the burden on client devices. For example, a content streaming server—which may be implemented using one or more virtual machines (VMs), GPUs, servers, and/or other computing devices—may handle (e.g., manage, host, conduct, and/or facilitate) rendering of a gaming application. For example and without limitation, the content streaming server may handle rendering for an individual seat or instance of the application for a particular user using an assigned VM, GPU, etc. Likewise, a compositing server may be similarly implemented using one or more virtual machines, GPUs, virtual desktops, servers, and/or other computing devices, and may manage the rendering and composition of various types of data (e.g., graphic design assets, gameplay, audio data, video data) related or relevant to broadcast, which may be separate and independent from the rendering of the gaming application output. Each of the content streaming server and compositing server may also install and execute virtual drivers for I/O devices (e.g., microphones, cameras, etc.) local to a client device to simulate each server receiving input signals directly (e.g., such that cloud-based or remote device can execute a client application, such as a compositing application, without requiring reprogramming of the application for cloud execution).

As such, because the content streaming server and/or compositing server are implemented using devices remote to a client device, the client device is less likely to experience processing and performance bottlenecks. Likewise, because each server may use virtual I/O drivers associated with the client device, the content streaming server and compositing server may execute applications on the client device with little to no additional configuration. In some embodiments, each server may use established plug-in architectures that abstract the source of the input data to provide seamless execution of applications. In some examples, the content streaming server and the compositing server, regardless of whether each is a virtual machine, server, GPU, or other computing device, may be executed on the same or different servers.

In some examples, the content streaming server may remotely execute a gaming application including executing any number of instances of a game—including instances to perform the rendering graphical output of the gameplay. The client device may receive rendered gameplay from the content streaming server and, in response, transmit input data to allow a user to interact with the game (via one or more user interfaces and/or user input devices, for example and without limitation). The content streaming server may also provide graphically-rendered gameplay output to the compositing server for composition with other data. Along with rendered gameplay received from the content streaming server, the compositing server may also receive graphic design assets, audio data, and video data from the client device. With the received data, the compositing server may composite the data based on the user's selections. For instance, the compositing server may provide the user with a rendered user interface to provide the user with controls for adjusting a layout with the content to be composited. Once composited, the compositing server may stream the composited content to a broadcasting server, which broadcasts the content to one or more other client devices (e.g., a broadcasting server that broadcasts to a wide audience through a streaming service). As a non-limiting example, by executing some processing tasks in the cloud (e.g., gameplay rendering, compositing), one or more of the devices in the system, especially the client device, may benefit from improved bandwidth usage, increased processing speeds, lower-latency, higher game stream resolution, and a high-quality broadcast experience.

BRIEF DESCRIPTION OF THE DRAWINGS

The present systems and methods for executing applications on remote computing devices to composite and broadcast gameplay with video and audio data are described in detail below with reference to the attached drawing figures, wherein.

DETAILED DESCRIPTION

Figure 1:
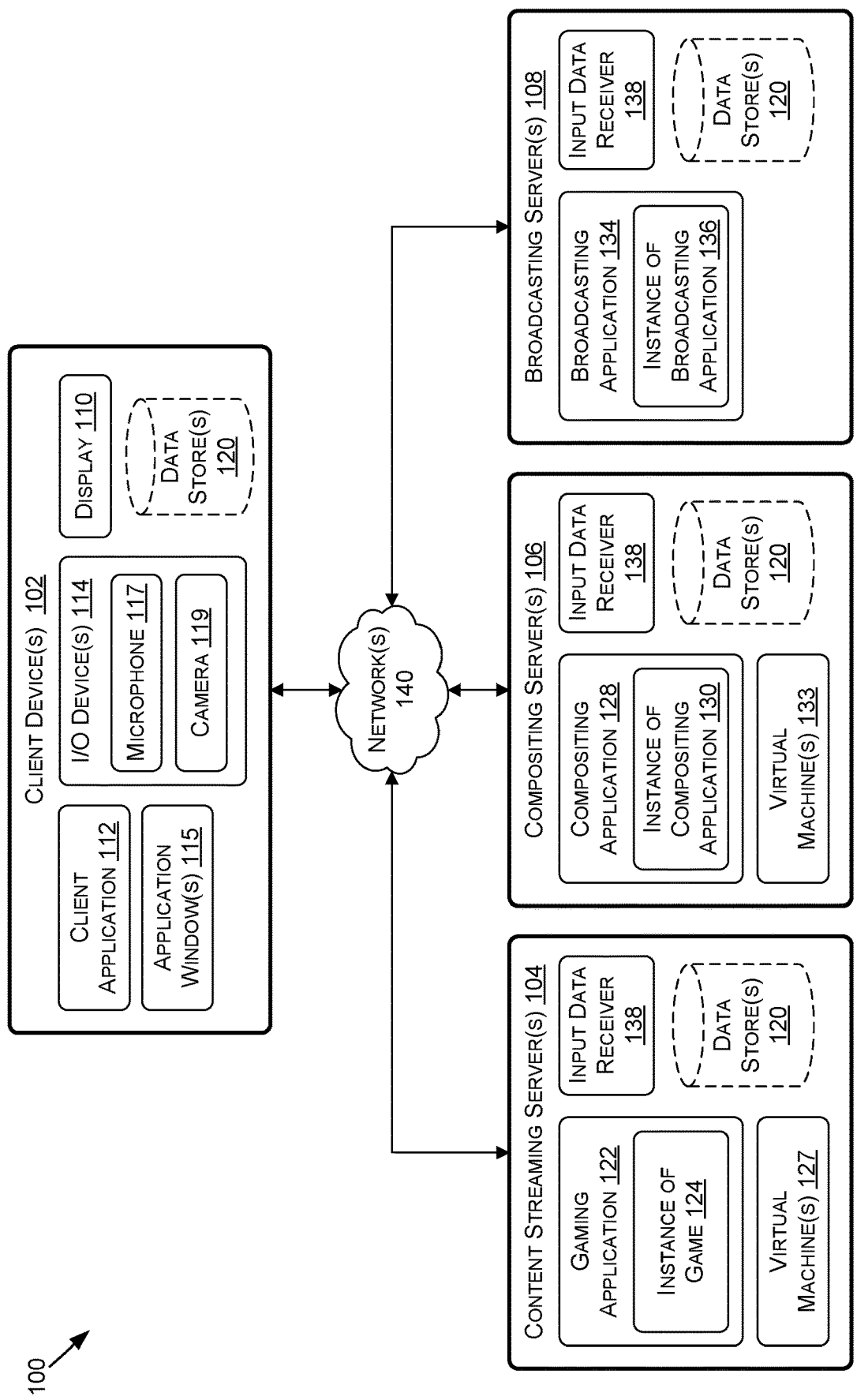
FIG. 1 is a block diagram of an example content streaming, compositing, and broadcasting system suitable for use in implementing some embodiments of the present disclosure.

Systems and methods are disclosed related to execution of applications on remote computing devices to composite and broadcast gameplay with video and audio data. As described herein, and in contrast to conventional systems, the present disclosure provides for executing applications, including those that involve compositing, broadcasting, and/or gaming, on remote computing devices in an effort to efficiently leverage compute resources, network usage, and storage capacity in the cloud as opposed to on a user's local device. As a result, a computing device(s) (e.g., a server responsible for rendering gameplay, compositing gameplay with additional elements, and broadcasting the composited content to one or more users) and a client device(s) (e.g., a tablet, computer, smartphone, streaming device, game console, or other device that displays a livestream of the game as well as a user interface to aid in composition of content and receives and transmits inputs) may be responsible for executing tasks within the system in a way that allows for a high-quality, low-latency experience for both the user playing a game and the users that are receiving broadcasted content.

In contrast to conventional systems, such as those described herein, the system of the present disclosure receives multiple streams of data including gameplay, audio data, and video data, composites the data, and broadcasts the composited data to a viewing audience—all of which may be executed on one or more remote computing devices (e.g., hosted using one or more virtual machines in a data center). As a result, the user's local computing device has a reduced processing and bandwidth burden (in part due to the local computing device no longer having to render gameplay, composite content, and transmit the content to a broadcasting service), the quality of broadcasted data remains high, and latency is low with respect to gameplay and synchronized audio/video data. For example, a client device may receive a stream of gameplay data, such as data from a gaming application that has been rendered by a (first) remote computing device. In some embodiments, an instance of the gaming application is rendered on a local computing device. During gameplay, the client device may send live audio and video data of the user to a (second) remote computing device, and the (second) remote computing device may then composite, using a compositing application, the audio and video data with other data, such as rendered gameplay from the (first) remote computing device. In some embodiments, the computing devices may be distinct applications in the same virtual desktop, virtual machine, or device. Likewise, the computing devices may be separate virtual desktops executed within the same (or different) virtual machine(s) or device(s). The various data to be composited (e.g., gameplay, audio data, video data, other graphical or audio data, etc.), once rendered by the (second) remote computing device, may be transmitted to the client device. In some embodiments, the data to be composited may be streamed to the user within a virtual desktop that includes a user interface corresponding to a compositing/broadcasting application that includes controls (e.g., options for users to create and modify layouts of broadcasting content) and a preview of the composited content. In some embodiments, the compositing application and the broadcasting application are executed on different computing devices and/or virtual machines. The (second) remote computing device may receive input data corresponding to the compositing application and adjust the composited data accordingly. Once composited, the (second) remote computing device may generate or render additional streams of data that may be broadcasted to a larger audience. In some embodiments, the composited data and/or additional streams of data are transmitted by the (second) remote computing device to one or more broadcasting servers/services. By using one or more computing devices remote to the client device to composite data, the capacity of the user's local computing device does not create a bottleneck for the performance and quality of the viewing user's experience. Some non-limiting benefits of the system and methods of the present disclosure are increased quality of streamed gameplay, low latency in gameplay, and low latency in synchronization of audio and video with gameplay, and the ability to customize composited content that is broadcasted to a large audience of viewers—thereby reducing computational burden on a user's local computing device or the requirement that users have local access to a high performance computing device.

In some embodiments of the present disclosure, and to ultimately help distribute the gaming application and compositing application workloads, the computing devices may be implemented using a variety of devices, each of which is remote to a client device. For instance, the remote computing devices may include one or more virtual machines (VMs) that may use one or more graphics processing units (GPUs) to execute a game (or other content) streaming application and a compositing application. In some embodiments, the computing devices may be one or more VMs that are implemented on the same or different servers—e.g., a first VM corresponding to the gaming application and a second VM corresponding to the compositing application. Similarly, in some embodiments, the computing devices may be one or more GPUs. Likewise, each VM may host one or more virtual desktops corresponding to one or more instances of the game and/or one or more instances of the compositing application. By using a combination of remote computing devices, the computational necessities of the gaming and/or compositing applications may be dynamically distributed across multiple computing devices based on current compute requirements of a current game/composite combination. For instance, an instance of the gaming application may be executed on a VM including a high power GPU that will provide a high quality gaming experience while an instance of the compositing application may be executed using a VM including a lower power GPU. By distributing the application instances onto separate, remote devices, the user is able to have a high performance experience with little latency.

The use of multiple remote devices also provides a user with the ability to easily customize how different assets, audio data, video data, gameplay, and other data are composited and incorporated before being broadcasted to a large audience. For instance, the user of a client device (e.g., player of the gaming application) may view each executing application in a separate application window (e.g., corresponding to one or more virtual desktops, in embodiments), where one window represents gameplay of the gaming application and another window represents a user interface to customize how the user's rendered gameplay is composited with audio and visual data. As the user changes the layout and other details of the composited data in the user interface, the changes may be transmitted to the (second) remote computing device. The composited data is then modified accordingly and broadcast to other users. In some embodiments, data regarding control of the gaming application may be input on the user's local computing device and transmitted to the (first) remote computing device such that the inputs affect the rendering of the streamed gameplay. By executing instances of the gaming and compositing applications on remote computing devices, the user is able to have control over each application as if it was executing on the user's local computing device without loss in quality due to latency or overburdened computing resources.

In some embodiments, the remote computing devices may use or install virtual or simulated drivers to simulate the remote computing devices receiving input data locally (e.g., audio data from a microphone, video data from a camera, changes made by the user to control gaming and compositing applications using a keyboard and/or mouse). For instance, audio and video data that is received initially by the user's local computing device via a microphone and camera, may be transmitted to the (second) remote computing device and ultimately applied to the VM executing the compositing/broadcasting application using one or more virtual drivers. In some embodiments, the remote computing devices may use plug-ins associated with applications that abstract the source of the input data. Through the use of the virtual driver(s) and/or plug-ins, the remote computing device may receive input data as though it were being received by local input devices (e.g., microphones, cameras, gaming controllers, etc.) physically attached to the remote computing device. In this way, the applications executing on the one or more remote computing devices (e.g., VMs) may be unaware that they are being executed in the cloud, thus not requiring any modifications or customization of the applications for execution in a cloud-based environment (e.g., applications are executed as if they were being run locally).

With reference to FIG. 1, FIG. 1 is an example content streaming, compositing, and broadcasting system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 may include similar components, features, and/or functionality to that of example content streaming system 600 of FIG. 6, example computing device 700 of FIG. 7, and/or example data center 800 of FIG. 8.

The content streaming, compositing, and broadcasting system 100 may include, among other things, one or more client device(s) 102, one or more content streaming server(s) 104, one or more compositing server(s) 106, one or more broadcasting server(s) 108, and/or one or more network(s) 140. Although illustrated as discrete devices, this is not intended to be limiting. For example, in some embodiments, one or more of the content streaming server(s) 104, the compositing server(s) 106, and the broadcasting server(s) 108 may correspond to a same server. In addition, the servers 104, 106, and/or 108 may share computing resources, such as by way of virtual machines, or may include discrete or separate computing resources. The content streaming, compositing, and broadcasting system 100 (and the components and/or features thereof) may be implemented using one or more computing device(s), such as the computing device 700 of FIG. 7 and/or the data center 800 of FIG. 8, described in more detail herein.

Each of the devices or components of the content streaming, compositing, and broadcasting system 100 may communicate between and among one another using the network(s) 140. The network(s) 140 may include a wide area network (WAN) (e.g., the Internet, a public switched telephone network (PSTN), etc.), a local area network (LAN) (e.g., Wi-Fi, Ethernet, etc.), and/or another network type.

The client device(s) 102 may include a smart phone, a laptop computer, a tablet computer, a desktop computer, a wearable device, a game console, a virtual, augmented, and/or mixed reality system (e.g., a headset, a computer, a game console, remote(s), controller(s), and/or other components), a streaming device (e.g., an NVIDIA SHIELD), a smart-home device that may include an intelligent personal assistant, another type of device capable of supporting at least display of a livestream of a gaming application 122 and/or inputs from an I/O device(s) 114.

The client device(s) 102 may include a display 110, one or more I/O device(s) 114, a client application 112, one or more data store(s) 120, and/or an application window(s) 115 (which may correspond to a virtual desktop, in embodiments, or may include at least a portion of a display space on a display 110 of the client device 102). In some examples, at least some of the functionality of the application window(s) 115—which may correspond to respective virtual desktop streams from one or more of the servers 104 or 106—may be executed within the client application 112. Although certain components and/or features of the client device(s) 102 are illustrated in FIG. 1, this is not intended to be limiting. For example, the client device(s) 102 may have additional or alternative components, such as, without limitation, those described herein with respect to the computing device 600 of FIG. 6. The features and functionality of the client device(s) 102 may be described in more detail herein with respect to FIGS. 2A-C.

The client application 112 may be a mobile application, a computer application, a console application, a game application, a virtual desktop application, and/or another type of application. The client application 112 may include instructions that, when executed by a processor(s) of the client device(s) 102, cause the processor(s) to perform one or more operations (such as but not limited to the operations described herein with respect to the content streaming, compositing, and broadcasting system 100). The client application 112 may operate as a facilitator for enabling gameplay of a gaming application 122—e.g., to facilitate a particular instance of the game from a perspective of a user of the client application 112. For example, the client application 112 may, without limitation, display a livestream of a game received from the content streaming server(s) 104 and/or rendered locally, transmit information to be composited with live gameplay to compositing server(s) 106, receive and/or process inputs from one or more of the I/O device(s) 114 of the client device(s) 102, and/or cause transmission of input data representative of the inputs (e.g., inputs to a gaming application and/or inputs to a user interface of a compositing application) to the content streaming server(s) 104 and/or the compositing server(s) 106. In some examples, as described herein, the client application 112 may include some of the features or functionality of a virtual desktop, such as rendering a user interface with gameplay and/or additional data (e.g., chat functionality, logos, stickers, other graphic design assets) to composite with the gameplay, etc. In addition, in some examples, the client application 112 may cause broadcasting of gameplay composited with other elements to one or more other users (e.g., transmitting composited content directly to a broadcasting server(s) 108), etc.

The application window(s) 115 may correspond to a mobile application, a computer application, and/or another type of application. In some embodiments, the application window(s) 115 may provide the user with data rendered by a computing device remote to the client device(s) 102. In some embodiments, the application window(s) 115 may provide the user with—or may display—a user interface to facilitate control of the execution of an instance of a game 124 on a content streaming server(s) 104. Likewise, the application window(s) 115 may also facilitate control of an instance of a compositing application 130 on compositing server(s) 106 and of an instance of a broadcasting application 136 on broadcasting server(s) 108 through one or more user interfaces and/or application window(s) 115. For example, if the content streaming server(s) 104 and compositing server(s) 106 are remote to the client device, the application window(s) 115 may, without limitation, display gameplay received from the content streaming server(s) 104, display a user interface (as rendered by compositing server(s) 106) including a layout of a livestream of a game and other graphic design assets from data store(s) 120, transmit information to be composited with live gameplay to compositing server(s) 106, receive and/or process inputs from one or more of the I/O device(s) 114 of the client device(s) 102 and/or cause transmission of input data representative of the inputs to the content streaming server(s) 104. In addition, in some examples, the application window(s) 115 may facilitate broadcasting of composited content (e.g., livestreaming gameplay composited with audio data, video data, and/or graphic design assets) to one or more other users. In some embodiments, as described herein, the application windows 115 may correspond to virtual desktop windows, or may display a stream(s) of data received from a remote device executing a virtual desktop application.

The client device(s) 102 may include one or more components (e.g., a communication component, network interface, etc.) and features for communicating across one or more networks, such as the network(s) 140. As a non-limiting example, to communicate within the content streaming, compositing, and broadcasting system 100, the client device(s) 102 may use a wired Ethernet connection and/or Wi-Fi connection through a router to access the Internet in order to communicate with the content streaming server(s) 104, the compositing server(s) 106, and/or broadcasting server(s) 108.

The display 110 may include any type of display capable of displaying the game (e.g., a light-emitting diode display (LED), an organic LED display (OLED), a liquid crystal display (LCD), an active matrix OLED display (AMOLED), a quantum dot display (QDD), a plasma display, and/or another type of display). In some examples, depending on the configuration of the client device(s) 102, the display 110 may include more than one display (e.g., a dual-monitor display for computer gaming, a first display for controlling a game and a second display for controlling composition of gameplay with additional digital elements, etc.). Where the display 110 is a touch-screen display, such as a touch-screen of a smart phone, tablet computer, laptop computer, and/or the like, the display 110 may be used as at least one of the I/O device(s) 114 of the client device(s) 102 (e.g., one of the I/O device(s) 114 for generating inputs to the game 124 for transmission to the content streaming server(s) 104 for updating the rendering of the gameplay and for generating inputs to a compositing application 130 for updating the layout of gameplay and other graphic design assets being composited).

The I/O device(s) 114 may include any type of devices that are capable of providing user inputs to the game. The I/O device(s) 114 include a microphone 117 and camera 119. In some embodiments, the microphone 117 and camera 119 are positioned to capture the user's facial expressions, the user's movement of input devices such as game controllers, and vocal commentary by the user during gameplay. For instance, the microphone 117 may generate audio data of the user's comments during gameplay and provide timestamps for the data as it is being recorded. Similarly, the camera 119 may capture video data of the user (e.g., facial expressions, hand movements on the game controller, etc.) with timestamps corresponding to the video data as well. The I/O device(s) may also include a keyboard, a mouse, a joystick, speakers, a touch-screen display 110, a controller(s), a remote(s), a headset (e.g., sensors of a virtual, augmented, and/or mixed reality headset), another type of input device, and/or a combination thereof. For instance, the I/O device(s) 114 may include devices that capture control signals with respect to a game controller (in order to modify gameplay based on the user's movements of parts of the game controller), a keyboard and mouse (in order to modify gameplay and/or layouts of gameplay and graphic design assets displayed in an application window 115), a microphone 117, and/or a camera 119 (in order to capture the user's expressions and commentary during gameplay).

The data store(s) 120 may include any memory device types. The data store(s) 120 may store some or all of livestream of gameplay in embodiments where the client device(s) 102 may be tasked with storage and/or generation of composited content. For example, the data store(s) 120 may store an entire game stream, as well as snapshots, highlights, and/or recordings generated from the stored game stream. In some embodiments, the data store(s) 120 may store graphic design assets (e.g., stickers, digital graphics, chat conversations with other players, etc.) associated with the user that may be used to augment a livestream of gameplay. For instance, the data store(s) 120 may store digital images of a logo associated with a user's brand that the user intends to play in the lower-right corner of livestreamed gameplay. Additionally, the data store(s) 120 may include other real-time information such as chat conversations associated with the user. In some embodiments, the data store(s) 120 may store audio and video data of the user.

The content streaming server(s) 104 may include a gaming application 122 that executes one or more instances of a game 124 on a computing device that is remote to the client device(s) 102. In some embodiments, the content streaming server(s) 104 may render the game 124, and communicate the gameplay stream to one or more device(s) as one or more streams of the game—e.g., a first stream to the client device(s) 102 and a second stream to a compositing server(s) 106 and/or broadcasting server(s) 108. In some embodiments, the two or more streams of the game may be copies of gameplay as rendered by the instance of the game 124. For instance, the instance of the game 124, which is an executed instance of gaming application 122, including audio and video elements of gameplay, may be rendered and sent to client device(s) 102 to present the current state of gameplay to the user. The rendered instance of the game 124 may also be streamed to compositing server(s) 106 to enable composition of the livestreaming gameplay with additional graphic design assets. In some embodiments, sending separate streams of a rendered instance of the game 124 via network(s) 140 may be advantageous to simultaneously display a stream of the instance of the game 124 at a client device(s) 102 and/or provide another stream of the instance of the game 124 to a compositing server(s) 106 for composition of gameplay with additional graphic design assets in order to reduce latency between frames and the frequency of dropped frames.

The gaming application 122 may receive input data representative of inputs to the client device(s) 102 through input data receiver 138, render an instance of a game 124, encode the instance of the game 132 into one or more streams, and transmit the stream(s) to the client device(s) 102 and/or compositing server(s) 106.

The content streaming server(s) 104 may include an input data receiver 138 for receiving input data representative of inputs to the client device(s) 102 with respect to the transmitted stream of the instance of the game 124. For instance, the instance of the game 124 may be streamed and presented to the client device(s) 102. In response, the user may provide inputs to control the instance of the game 124 through game controllers such as a joystick, a keyboard, a mouse, etc. In some embodiments, the input data receiver 138 may install and execute virtual drivers corresponding to I/O device(s) 114 on client device(s) 102 in order to receive the input data as though it were local to the content stream device(s) 104. That way, the gaming application 122 does not need to be configured or modified in order to execute on content streaming server(s) 104 instead of client device(s) 102. The features and functionality of the content streaming server(s) 104 may be described in more detail herein with respect to FIGS. 2A-3.

The content streaming server(s) 104 may use a virtual machine(s) 127 to execute an instance of the gaming application 122 for a particular client device. The virtual machine(s) 127 may render one or more user interfaces that are encoded and streamed—e.g., as virtual desktop(s)—to the client device(s) 102, to facilitate control of the instance of the game 124. For example, the virtual machine(s) 127 may render one or more user interfaces in order to provide the user with options to navigate through a video game. Once rendered, the virtual machine 127 may communicate with client device(s) 102 to stream the user interface and cause presentation of the user interface on virtual desktop(s) 115 and/or I/O device(s) 114. In some embodiments, the virtual machine 127 may be executed on a device (e.g., server, PC) along with other virtual machines, such as virtual machine 133. The virtual machine may also be executed using one or more GPUs to facilitate rendering of the instance of the game 124. Similarly, the GPU may be shared with compositing server(s) 106 and/or may be a separate GPU that resides on the same device (e.g., server, PC) as the compositing server(s) 106. In addition, in some examples, the virtual machine 127 may facilitate transmission of a rendered instance of a game 124 to compositing server(s) 106. In some embodiments, the virtual machine 127 may use one or more virtual desktops to execute the gaming application 122 as the instance of a game 124.

The content streaming server(s) 104 may include the data store(s) 120, similar to the data store(s) 120 of the client device(s) 102, compositing server(s) 106, and/or the broadcasting server(s) 108, described herein.

The compositing server(s) 106 may include a compositing application 128 that is implemented as an instance of a compositing application 130 on a computing device that is remote to the client device(s) 102. For instance, the compositing server(s) 106 may render one or more instances of the compositing application 130 (or at least a user interface thereof), and stream the rendered content to one or more device(s). The streams of the compositing application may be copies of rendered data of instance of the compositing application 130. For example, the compositing application 128 may be executed as the instance of the compositing application 130, including audio and video data of the user synchronized with gameplay and graphic design assets, and sent to client device(s) 102 as a user interface to enable the user to view how content is being composited. In some embodiments, the compositing application may only render the user interface, and the synchronization of the live gameplay may be executed by the client device 102 using a locally rendered and/or received stream of the live gameplay. In some embodiments, the composited content is rendered, without a user interface, and sent to a broadcasting server(s) 108 for transmission to one or more other client devices corresponding to a broadcast audience. For example, the broadcasting server(s) 108 may be a broadcasting service that has no need for a user interface. Providing separate streams of the compositing application 128, which is executed as an instance of the compositing application 130 by a computing device remote to the client device(s) 102 via network(s) 140, may be advantageous to simultaneously display an instance of the compositing application 130 at a client device(s) 102 in the form of a user interface and/or provide another stream of the compositing application 130 (as a stream) to a broadcasting server(s) 108 for broadcast of composited content in order to distribute the processing load of compositing customized content to other high performance devices in the system 100. The features and functionality of the compositing server(s) 106 may be described in more detail herein with respect to FIGS. 2A-3.

The compositing server(s) 106 may include a compositing application 128 for compositing streaming gameplay, graphic design assets, audio and video data of the user, and/or additional information. For instance, the compositing server(s) 106 may composite video and audio data from the user with gameplay so that the audience may view livestreamed gameplay and the user's reactions and comments in real-time. For example, the compositing server(s) 106 may composite live gameplay in a large portion of the screen with a smaller portion of the screen devoted to the user's video data. The user's video data may be further composited with filters and/or frames around the data that provide logos associated with the user or other graphic design assets. In some embodiments, the audio and video data may be synchronized with the gameplay such that the user's comments and facial expressions are displayed simultaneously on the screen with livestreamed gameplay. In some embodiments, the display of audio and video data may be synchronized with gameplay by aligning timestamps from each type of data.

In this way, the compositing application 128 may be implemented as an instance of a compositing application 130 by a computing device that is remote to the client device(s) 102 to shift the workload of compositing gameplay and other data from a user's local device, such as client device(s) 102, into the cloud that has additional resources and bandwidth. As a result, the client device(s) 102 has reduced burden on its compute resources with respect to composition of different types of data.

The compositing server(s) 106 may also communicate with a variety of sources to retrieve content to composite with gameplay. In some embodiments, graphic design assets (e.g., custom logos, avatars, gifs, videos) that only reside in the data store(s) 120 of client device(s) 102 may be transmitted to the compositing server(s) 106 for composition as well. Similarly, the compositing application 128 may also retrieve additional information, such as chat messages, from other remote computing devices (e.g., servers that manage chat functionality on online gaming platforms).

The compositing application 128 may also provide one or more user interfaces to allow the user to modify layouts that include gameplay, video data, audio data, and other graphic design assets. For instance, the compositing application 128 may render a user interface, which is encoded and streamed to the client device(s) 102, to facilitate control and modification of a layout through interaction. A layout may display the data to be composited along with the position, alignment, and sizing of each type of data on a screen. For example, the user may interact with a user interface to modify a layout by shrinking the size of livestreamed gameplay to occupy 75% of the screen and adding a customized digital frame around the gameplay in the remaining space. Additionally, the user may further interact with the user interface to overlay incoming chat messages on top of the frame area and place it below the gameplay. In some embodiments, the user may be able to preview a screen of composited content as it would be broadcasted to an audience. As the user continues gameplay, the user may adjust the types of content being composited as well as the placement, size, position, etc. of the content. In some embodiments, the user interfaces may also enable a user to toggle between different types of data. For example, the user may use pre-set layouts and select toggle between them during gameplay. As described herein, the user interaction with the streamed user interface—displayed within an application window—may include generating input data, transmitting the input data to the compositing server(s) 106, simulating one or more virtual drivers to a virtual machine(s) executing the application on the compositing server(s) 106, updating the user interface and/or composite information, and/or streaming the user interface and/or the updated composite information back to the client device(s) 102 to reflect the user's inputs. As such, the interaction with the user interface of the compositing application by the client device(s) 102 may be similar to that of an interaction with a virtual desktop application, thereby offloading the processing burden to the compositing server(s) 106.

The compositing application 128 may receive input data representative of inputs to the client device(s) 102 through input data receiver 138, render an instance of a compositing application 130, render a user interface for the user to modify layouts in one or more streams, and transmit the stream(s) to the client device(s) 102, the compositing server(s) 106, and/or the broadcasting server(s) 108 (e.g., without the user interface).

The compositing server(s) 106 may include an input data receiver 138 for receiving input data representative of inputs from the client device(s) 102. In some embodiments, the input data receiver 138 may receive audio and video data from the client device(s) 102 that will be composited with gameplay and broadcasted to other devices. The input data receiver 138 may also receive graphic design assets that are local to the client device(s) 102. In some embodiments, because the composited content (as displayed via a user interface rendered by the instance of the compositing application 130) may be broadcasted to additional client devices, the input data receiver 138 may also receive input data to control the instance of the compositing application 130 through I/O device(s) 114 such as a keyboard, a mouse, etc. As discussed herein, the input data may include control signals from client device(s) 102 that modify the content and arrangement of data in a layout.

In some embodiments, the input data receiver 138 may use input/output device virtual drivers to receive the input data as though it were local to the content stream device(s) 104 itself to reduce latency. For instance, the input data receiver 138 may install and execute virtual drivers associated with microphone 117 and camera 119 to simulate the compositing server(s) 106 receiving audio and video data from the I/O device(s) 114 locally and directly. That way, the compositing application 128 (or any other application on the compositing server(s) 106) need not be customized in order to execute seamlessly as an instance of the compositing application 130 on a computing device (e.g., using one or more virtual machines) remote to the client device(s) 102, such as the compositing server(s) 106.

The compositing server(s) 106 may use a virtual machine(s) 133 to execute the compositing application 128 as an instance of a compositing application 130. For instance, the virtual machine(s) 133 (including one or more virtual GPUs, one or more discrete GPUs, one or more virtual CPUs, and/or one or more discrete CPUs) may render one or more user interfaces to provide the user with the ability to modify layouts and adjust the composited content. The user interfaces, which may contain gameplay, audio data, video data, and/or other graphic design assets, may be rendered and streamed to application window(s) 115 of client device(s) 102. The virtual machine 133 may also receive input data from client device(s) 102 to update layouts and prepare composited content for broadcast. In some embodiments, the virtual machine may be executed on a device (e.g., server, PC) along with other virtual machines, such as virtual machine 127. The virtual machine may also include one or more GPUs (e.g., virtual or discrete) to facilitate executing the instance of the compositing application 130. In some embodiments, the virtual machine 133 may use one or more virtual desktops to execute the compositing application 128 as the instance of the compositing application 130. Similarly, the GPU(s) may be shared with compositing server(s) 106 and/or may be a separate GPU that resides on the same device (e.g., server, PC) as the compositing server(s) 106.

In some embodiments, the compositing server(s) 106 may communicate the composite content to a broadcasting server(s) 108. For instance, compositing application 128 may be implemented as the instance of the compositing application 130, including gameplay along with selected graphic design assets, audio data, and video data, and sent to broadcasting server(s) 108 to broadcast the composited content to other client devices.

The compositing server(s) 106 may include the data store(s) 120, similar to the data store(s) 120 of the client device(s) 102, content streaming server(s) 104, and/or the broadcasting server(s) 108, described herein. For example, the data store(s) 120 may retain information provided by the user for composition with gameplay for future reference. For example, the data store(s) 120 may locally store customized logos and graphic design assets that a user has previously transmitted for subsequent use.

The broadcasting server(s) 108 may include a broadcasting application 134 for broadcasting composited data to other client device(s) 102. In some embodiments, the broadcasting application 134 may be in communication with a service that provides a platform for other users to view livestreaming composited content. For instance, the broadcasting server(s) 108 may receive composited content from compositing server(s) 106 that may then be broadcasted to client devices of other users.

The broadcasting application 134 may be executed as an instance of a broadcasting application 136, receive input data representative of inputs to the client device(s) 102 through input data receiver 138, and transmit the stream(s) to the client devices of other users. In some embodiments, the broadcasting application 134 may also render a user interface and transmit the user interface to the application window(s) 115—e.g., as a virtual desktop or graphical overlay. The features and functionality of the broadcasting server(s) 108 may be described in more detail herein with respect to FIGS. 2A-3.

In some embodiments, the broadcasting application 134 may be executed as an instance of a broadcasting application 136, and communicate the composited content to one or more additional remote computing devices to facilitate broadcasting on a large scale. By executing an instance of a broadcasting application 136 on a broadcasting server(s) 108, which is remote to the client device(s) 102, the workload of compositing content, rendering gameplay, and also broadcasting composited content no longer burdens a user's local machine, which may not always be a high performance computing device.

The broadcasting server(s) 108 may include an input data receiver 138 for receiving input data representative of inputs to the client device(s) 102. For instance, the user may specify, through a rendered user interface displayed via application window(s) 115, that the composited content be broadcasted to a select audience of users or that the broadcast be facilitated by a particular broadcasting service. The broadcasting application 134 may adjust the parameters of the broadcasted material based on the received input data, which may change as the composited data is changed.

The broadcasting server(s) 108 may include the data store(s) 120, similar to the data store(s) 120 of the client device(s) 102, content streaming server(s) 104, and/or the compositing server(s) 106, described herein.

Figure 2A:
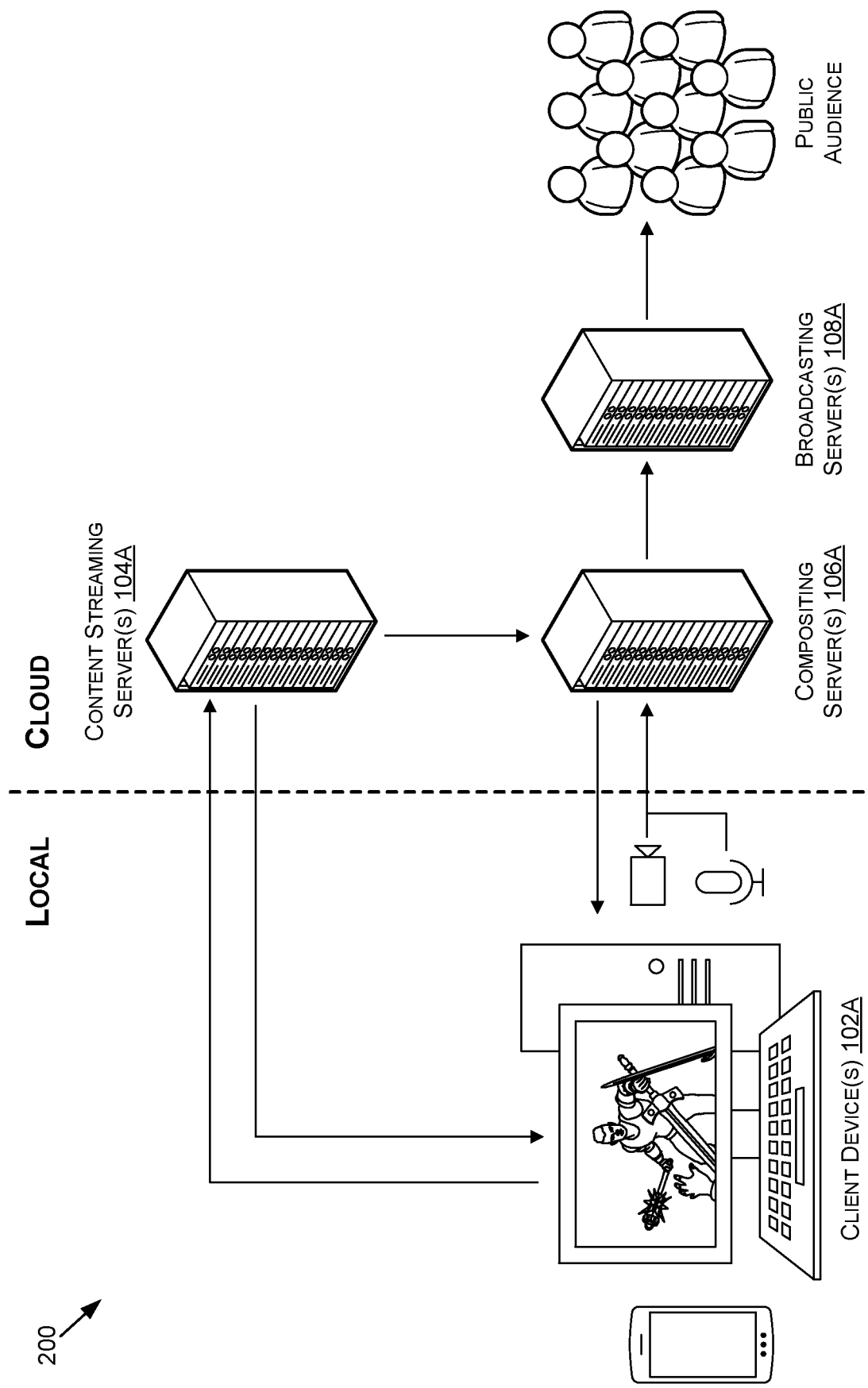
FIG. 2A is an example system diagram for content streaming, compositing, and broadcasting including a content stream server, a compositing server, and a broadcasting server, each of which is remote to a client device, for use in implementing some embodiments of the present disclosure.

Now referring to FIG. 2A, FIG. 2A is another example system diagram of a content streaming, compositing, and broadcasting system 200 including a content streaming server, a compositing server, and a broadcasting server, each of which is remote to a client device, in accordance with some embodiments of the present disclosure. The content streaming, compositing, and broadcasting system 200 may include, among other things, the client device(s) 102A (which may include similar components, features, and/or functionality to the client device(s) 102 of FIG. 1), content streaming server(s) 104A (which may include similar components, features, and/or functionality to the content streaming server (s) 104 of FIG. 1), compositing server(s) 106A (which may include similar components, features, and/or functionality to the compositing server(s) 106 of FIG. 1), and broadcasting server(s) 108A (which may include similar components, features, and/or functionality to the broadcasting server(s) 108 of FIG. 1).

In the content streaming, compositing, and broadcasting system 200, the client device(s) 102A may have a display and speakers to display content received from content streaming server(s) 104A and compositing server(s) 106A. For instance, the content streaming server(s) 104A may execute an instance of a game on the server, render gameplay, and stream the content to client device(s) 102A. As a result, the user of client device(s) 102A may view gameplay on their display through an application window. As shown in FIG. 2A, the game may be executed and rendered on content streaming server(s) 104A, which is remote to client device(s) 102A and is in the cloud. In some non-limiting embodiments, the content streaming server(s) 104A may be executed using a GPU(s) (e.g., virtual and/or discrete) that resides on a server separate from the compositing server(s) 106A and broadcasting server 108A.

As the user interacts with the game through a game controller or other I/O device connected to client device(s) 102A, input data is transmitted from client device(s) 102A to content streaming server(s) 104A. In some embodiments, the content streaming server(s) 104A may execute virtual drivers corresponding to the I/O devices associated with the client device(s) 102A in order to receive input data as though it were local to content streaming server(s) 104A. In some embodiments, the content streaming server(s) 104A may create multiple streams of the game and stream one instance to the client device(s) 102A and another stream to content streaming server(s) 104A. In some non-limiting embodiments, the compositing server(s) 106A is executed by a GPU(s) (e.g., virtual and/or discrete) that resides on a separate server than content streaming server(s) 104A and broadcasting server(s) 108A. Additionally, the compositing server(s) 106A may be executed by a GPU(s) (e.g., virtual and/or discrete) in the same computing device as content streaming server(s) 104A and/or broadcasting server(s) 108A.

By executing an instance of the game on a device remote to client device(s) 102A, the client device(s) 102A is no longer burdened with rendering memory-, compute-, and time-intensive image data to facilitate gameplay. Similarly, by offloading tasks to cloud-based resources, which are more likely to be upgraded frequently, a game can be rendered using high-performance, specialized hardware, such as one or more GPUs, that are built to render high-quality images with low latency. Likewise, the game may be rendered on a content streaming server(s) 104A that is executed on one or more virtual machines in the cloud. In some embodiments, however, the game may be rendered locally by the client device(s) 102A while offloading the rendered content to an instance of a broadcasting application executed using a remote compositing server 106A and/or host.

The compositing server(s) 106A may receive rendered gameplay from content streaming server(s) 104A (and/or the client device(s) 102A, in embodiments where the client device(s) 102A renders the game locally) as well as additional content from client device(s) 102A, all of which is composited. For example, the compositing server(s) 106A may receive livestreaming gameplay of a game from content streaming server(s) 104A and a layout, which details how the gameplay is overlaid with graphic design assets such as logos and live chat information, from client device(s) 102A. The compositing server(s) 106A may also receive audio and video data captured by a microphone and camera, respectively, from the client device(s) 102A, while the content streaming server(s) 104A receives user input corresponding to gameplay (e.g., via a user input device local to the client device(s) 102A). In some embodiments, the compositing server(s) 106A may synchronize the received data (e.g., audio and video data are in synchronization with gameplay) during composition.

In some embodiments, the compositing server(s) 106A may render and transmit a user interface that enables a user to modify layouts of content to client device(s) 102A. As the user modifies the layout through the user interface, the compositing server(s) 106A adjusts the arrangement and sizing of the received content. In some embodiments, the user interface is presented to the user through an application window—e.g., corresponding to a virtual desktop—on the client device(s) 102A. The user interface may also preview how the composited content will be appear to the audience receiving the broadcast. Once content has been composited, the compositing server(s) 106A may encode the composited content and stream it to broadcasting server(s) 108A.

As described with respect to content streaming server(s) 104A, by offloading tasks such as compositing content to cloud-based resources such as compositing server(s) 106A, the client device(s) 102A is no longer required to perform compositing tasks that can require high amounts of memory and bandwidth.

The broadcasting server(s) 108A may receive composite content from compositing server(s) 106A, encode the data, and stream it to a large number of client devices. In some embodiments, the broadcasting server(s) 106A may stream the data to one or more other servers or a service that facilitates broadcasting of content to several other client devices.

Figure 2B:
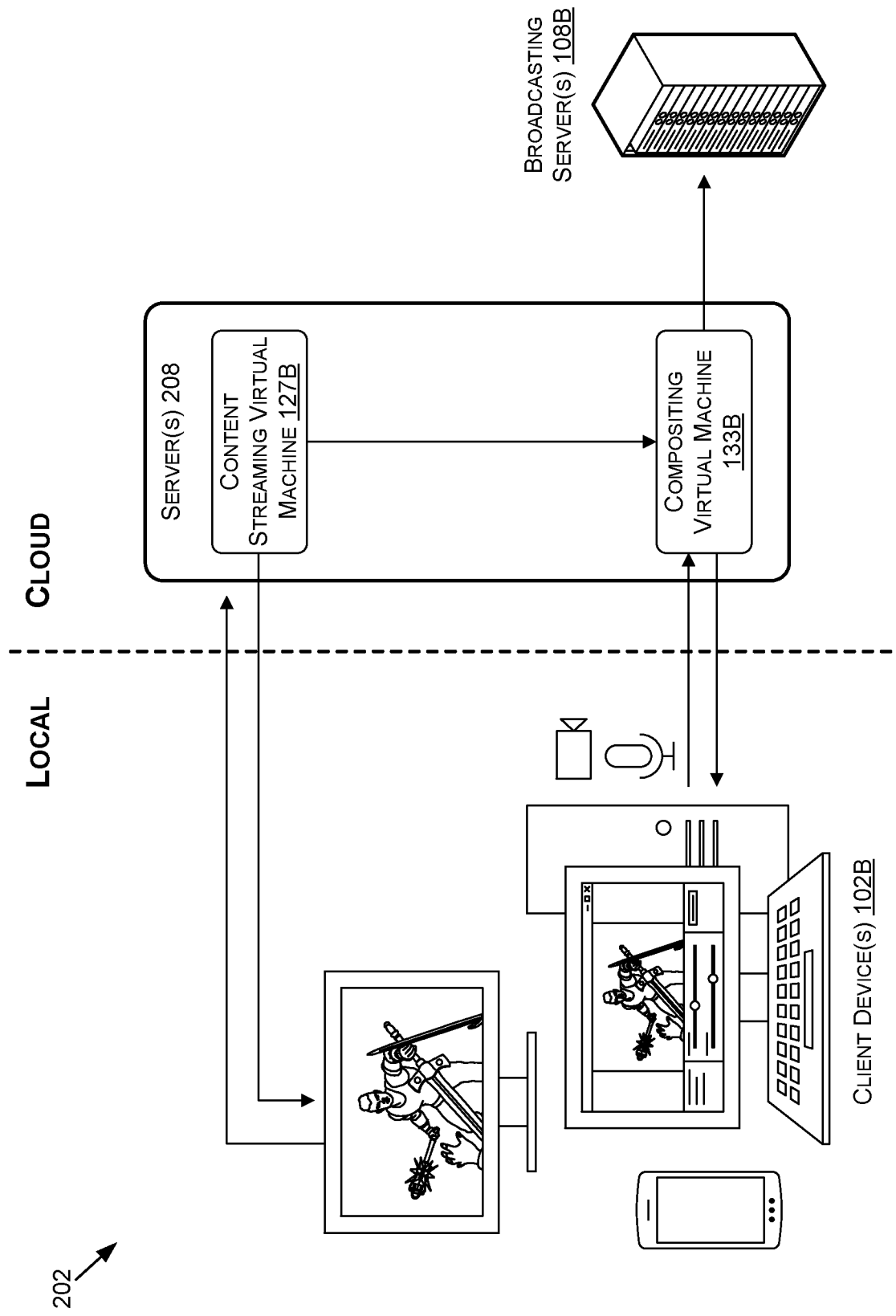
FIG. 2B is an example system diagram for content streaming, compositing, and broadcasting including a content streaming virtual machine, a compositing virtual machine, and a broadcasting server, each of which is remote to the client device, for use in implementing some embodiments of the present disclosure.

Similar to FIG. 2A, FIG. 2B includes components such as client device(s) 102B (which may include similar components, features, and/or functionality to the client device(s) 102 of FIG. 1), content streaming virtual machine 127B (which may include similar components, features, and/or functionality to the content streaming server(s) 104 of FIG. 1), compositing virtual machine 133B (which may include similar components, features, and/or functionality to the compositing server(s) 106 of FIG. 1), and broadcasting server(s) 108B (which may include similar components, features, and/or functionality to the broadcasting server(s) 108 of FIG. 1), as described herein. As shown in FIG. 2B, several components in system 202 interact in a different manner when compared to system 200 in FIG. 2A. For instance, the content streaming virtual machine 127B and the compositing virtual machine 133B are implemented as virtual machines on the same server(s) 208. With both the content streaming virtual machine 127B and compositing virtual machine 133B being executed by virtual machines on the same computing device, there is little lag-time in communications between the virtual machines, leading to the audience receiving a broadcasting experience that closely presents the user's interactions with the game in real-time. Once the content has been composited, the compositing virtual machine 133B may transmit the composited content to broadcasting server(s) 108B to broadcast the data to a large audience.

In some embodiments, the content streaming virtual machine 127B and the compositing virtual machine 133B may exist on separate servers. Likewise, the content streaming virtual machine 127B and the compositing virtual machine 133B may be implemented using separate GPUs (or separate virtual GPUs which may include shared GPU resources), which may be housed on the same or different servers with one another. Likewise, in some embodiments, each virtual machine may use different physical devices for execution. For example, because the content streaming virtual machine 127B renders high-quality gameplay images, the content streaming virtual machine 127B may be executed using a high-performance, specialized, parallel processor such as a GPU, while the compositing virtual machine 133B may be executed using a processor (e.g., CPU, or lower performing GPU) that is less tailored to high-quality graphics rendering.

Figure 2C:
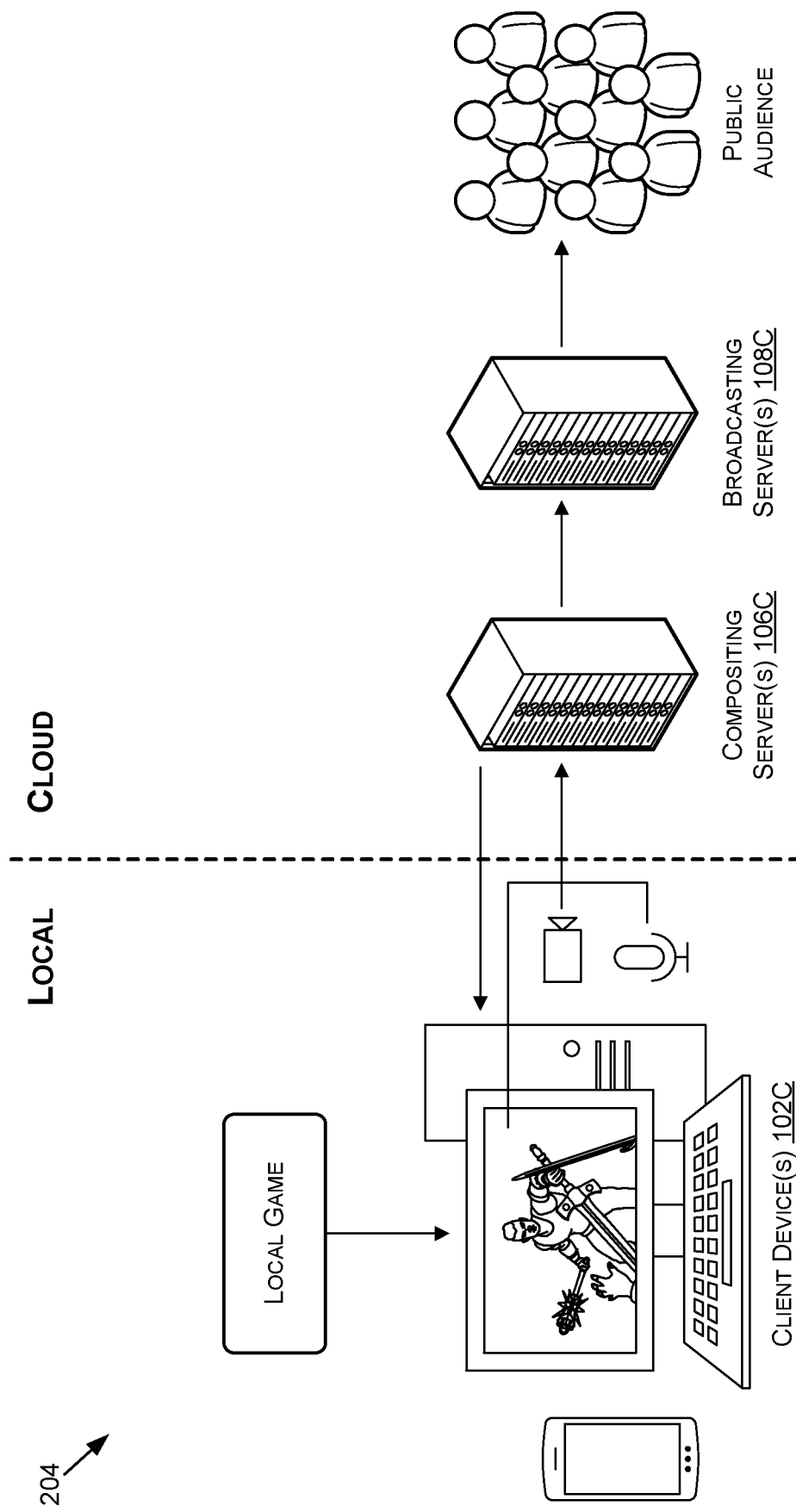
FIG. 2C is an example system diagram for content streaming, compositing, and broadcasting including a compositing server and a broadcasting server, each of which is remote to the client device, for use in implementing some embodiments of the present disclosure.

Similar to FIG. 2A, FIG. 2C includes components such as client device(s) 102C (which may include similar components, features, and/or functionality to the client device(s) 102 of FIG. 1), compositing server(s) 106C (which may include similar components, features, and/or functionality to the compositing server(s) 106 of FIG. 1), and broadcasting server(s) 108C (which may include similar components, features, and/or functionality to the broadcasting server(s) 108 of FIG. 1), as described herein. As shown in FIG. 2C, several components in system 202 interact in a different manner when compared to systems 200 and 202 in FIGS. 2A-2B, respectively. For instance, the client device(s) 102C executes an instance of the game locally. In this configuration, the client device(s) 102C renders gameplay of the instance of the game and streams the rendered gameplay with other content (e.g., graphic design assets, video data, audio data) to the compositing server(s) 106C for composition. The compositing server(s) 106C composites the received information and transmits it to broadcasting server(s) 108C, which broadcasts the composited data to a public audience.

Figure 3:
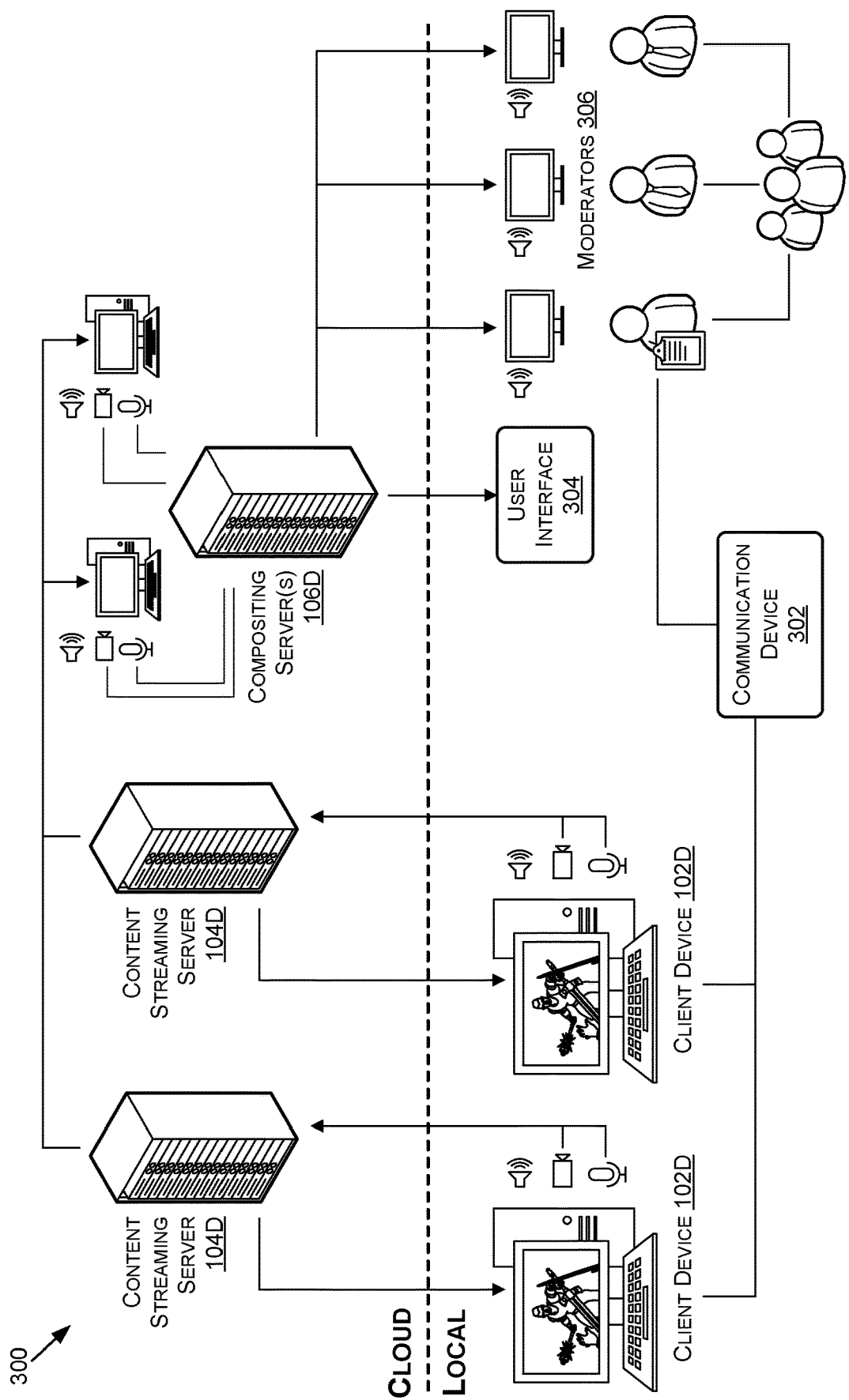
FIG. 3 is an example system diagram for content streaming and compositing by one or more moderators including a content streaming server and a compositing server, each of which is remote to one or more client devices, for use in implementing some embodiments of the present disclosure.

Similar to FIGS. 2A-2C, FIG. 3 includes components such as client device(s) 102C (which may include similar components, features, and/or functionality to the client device(s) 102 of FIG. 1), content streaming server(s) 104D (which may include similar components, features, and/or functionality to the content streaming server(s) 104 of FIG. 1), compositing server(s) 106D (which may include similar components, features, and/or functionality to the compositing server(s) 106 of FIG. 1), and broadcasting server(s) 108D (which may include similar components, features, and/or functionality to the broadcasting server(s) 108 of FIG. 1), as described herein. As shown in FIG. 3, system 300 depicts multiple users with client device(s) 102D interacting with instances of a game via one or more content streaming server(s) 104D. Each content streaming server(s) 104D may be dedicated to a particular user of client device(s) 102D. For instance, a given content streaming server(s) 104D may execute an instance of the game, render gameplay, stream it to an associated client device(s) 102D, receive input data from client device(s) 102D, and execute the instance of the game based on the input data. Each content streaming server(s) 104D may also transmit a stream of the game to compositing server(s) 106D for composition and display to a set of moderators 306.

The compositing server(s) 106D may composite each user's gameplay along with additional content corresponding to the user (e.g., information identifying which user is associated with a screen showing gameplay, audio data of the associated user, video data of the associated user) into a user interface 304. With a view of each user's gameplay composited with identifying information, one or more moderators 306 may communicate with the users of client device(s) 102D through communication device 302. For example, in an example scenario where users are playtesting an application or application version, the moderators 306 may instruct the users to test a particular feature. In some embodiments, system 300 illustrates a system for playtesting a game with multiple beta testers on client devices 102D being overseen by a set of moderators 306.

Figure 4:
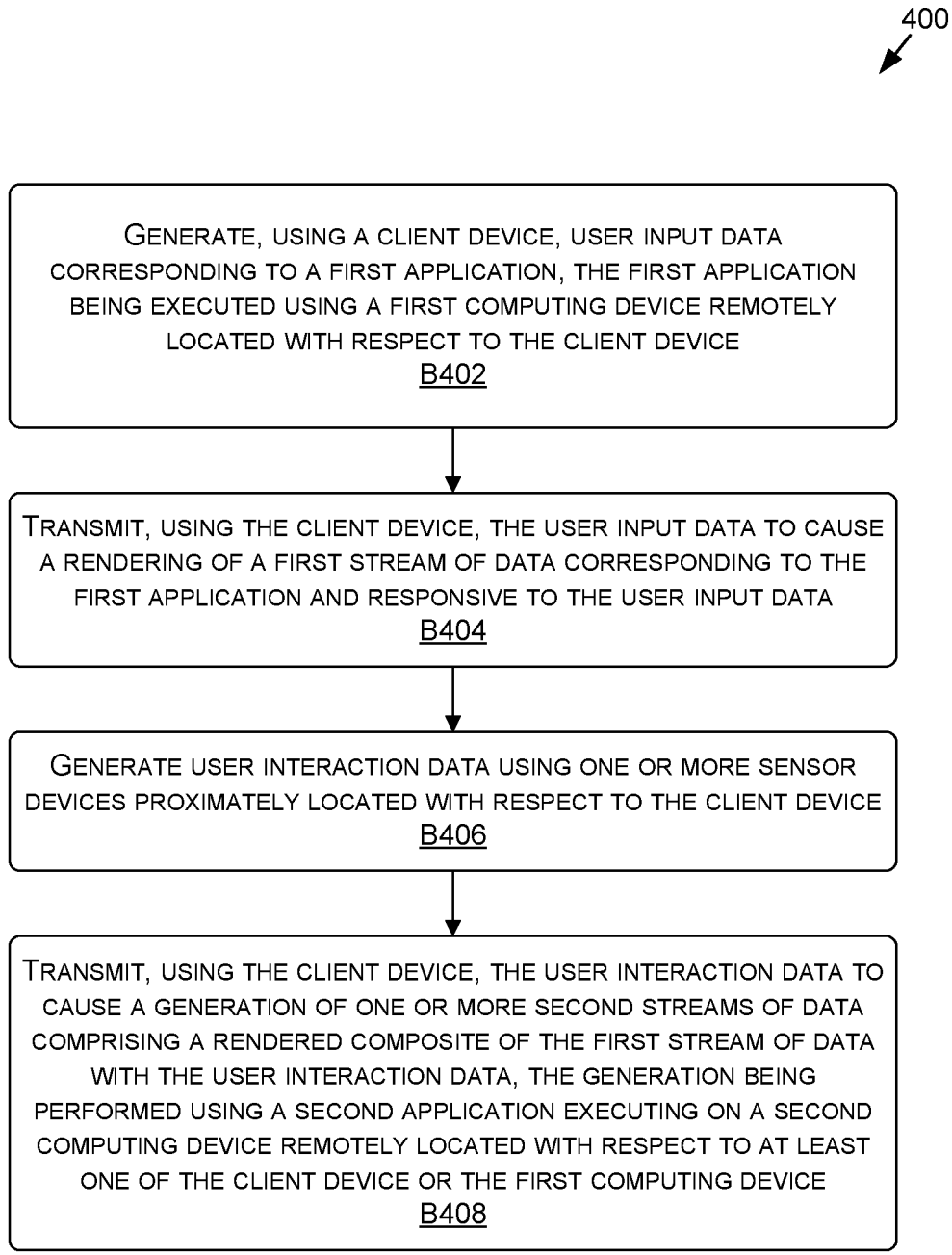
FIGS. 4-5 are flow diagrams showing methods for content streaming and compositing using remote cloud devices, in accordance with some embodiments of the present disclosure.
Figure 5:
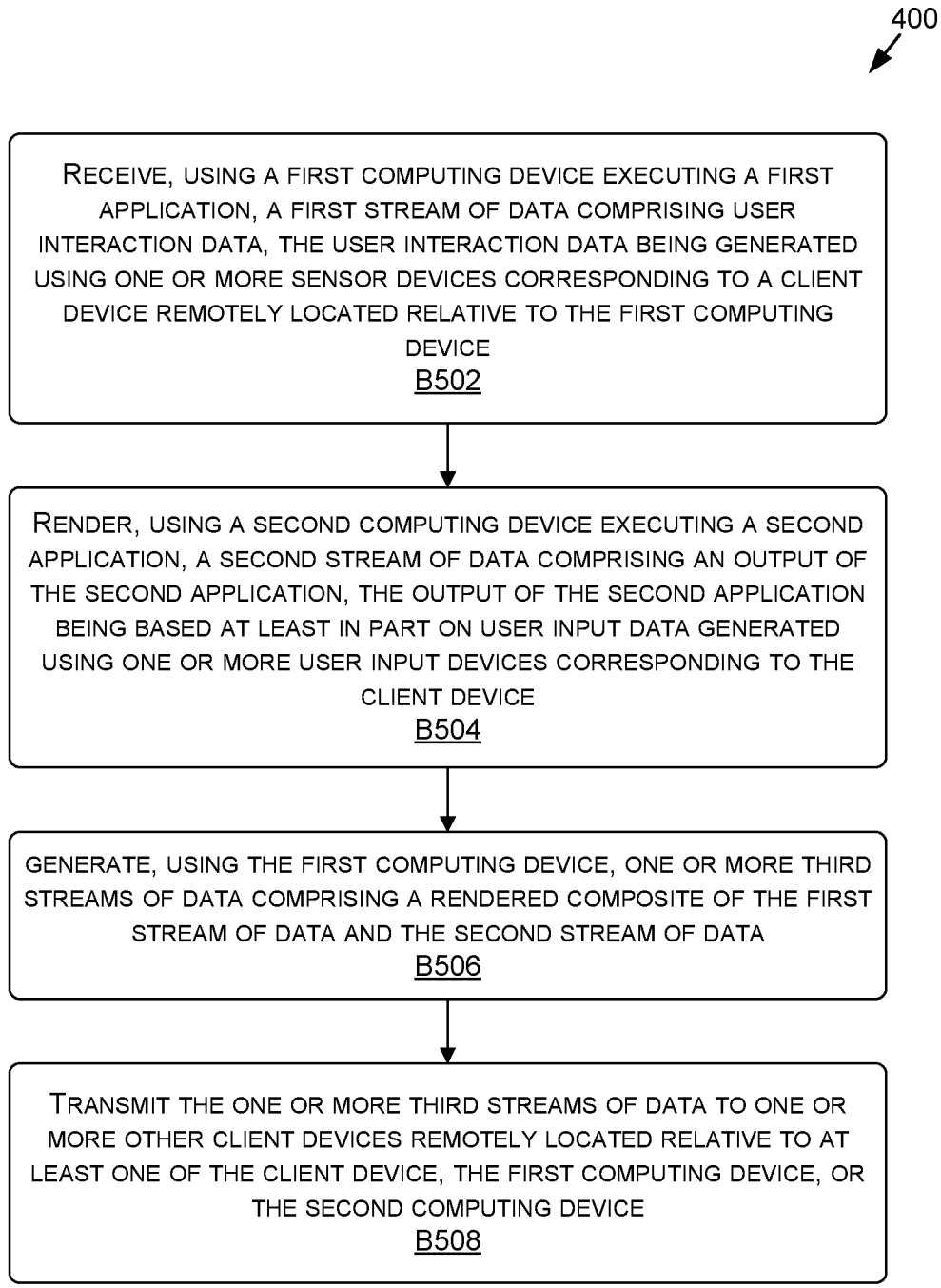

Now referring to FIGS. 4-5, each block of methods 400 and 500, described herein, comprises a computing process that may be performed using any combination of hardware, firmware, and/or software. For instance, various functions may be carried out by a processor executing instructions stored in memory. The methods 400 and 500 may also be embodied as computer-usable instructions stored on computer storage media. The methods 400 and 500 may be provided by a standalone application, a service or hosted service (standalone or in combination with another hosted service), or a plug-in to another product, to name a few. In addition, methods 400 and 500 are described, by way of example, with respect to the systems of FIGS. 1-3. However, this method may additionally or alternatively be executed by any one system, or any combination of systems, including, but not limited to, those described herein.

FIG. 4 is a flow diagram showing a method 400 for executing an instance of a game and compositing gameplay with other content on computing devices remote from a client device, in accordance with some embodiments of the present disclosure. The method 400, at block B402, includes generating, using a client device, user input data corresponding to a first application, the first application being executed using a first computing device remotely located with respect to the client. For example, FIGS. 2A-3 provide examples of systems where computing devices (e.g., content streaming server(s)) are remote from one or more client devices. In some embodiments, the first remote computing device may be one or more virtual machines, GPUs, virtual desktops, or other computing devices, each of which is remote to the client device(s) 102. As described herein, the first remote computing device may be a content streaming server(s) 104 that executes a first application (e.g., a gaming application), renders gameplay, and streams gameplay to the client device(s) 102. The user input data may include joystick movements, keyboard data, and mouse data as captured by client device(s) 102.

The method 400, at block B404, includes transmitting, using the client device, the user input data to cause rendering of a first stream of data corresponding to the first application and responsive to the user input data. For instance, as the user engages with the game, user input data is transmitted from the client device(s) 102 and causes rendering of gameplay that incorporates changes in accordance with the user input data. For example, if a user uses a joystick to navigate a game character through a scene, the transmission of user input data, which may include the direction and force with which the joystick was moved, would cause updated rendering of the gameplay. The updated rendering of gameplay, in turn, may be generated as a first stream of data. In some embodiments, the first stream of data corresponds to a live instance of the first application. In some embodiments, the first stream of data may be displayed on client device(s) 102 via one or more application window(s) 115. In some embodiments, the first stream of data may be copied into multiple instances that are sent to other computing devices.

The method 400, at block B406, includes generating user interaction data using one or more sensor devices proximately located with respect to the client device. User interaction data may include data that shows the user interacting with the first application (e.g., gaming application) that is being executed on the first computing device. For instance, sensor devices near the client device(s) 102 such as a microphone may capture audio data as the user engages in gameplay on the client device(s) 102. Likewise, a camera near client device(s) 102 may also capture video data while the user is playing the game on client device(s) 102. For example, FIGS. 2A-3 provide examples of systems where audio and video data are captured by the client device(s) 102 (via proximate sensor devices).

The method 400, at block B408, includes transmitting, using the client device, the user interaction data to cause a generation of one or more second streams of data comprising a rendered composite of the first stream of data with the user interaction data, the generation being performed using a second application executing on a second computing device remotely located with respect to at least one of the client device or the first computing device. For example, FIGS. 2A-3 provide examples of systems where computing devices (e.g., compositing server(s)) are remote from one or more client devices. In some embodiments, the transmission of user interaction data by the client device(s) 102 to the second computing device may cause the second computing device to generate additional streams of data. For instance, the second remote computing device, which may be a compositing server(s) 104, may execute a second application, such as a compositing application, and render a user interface that includes a layout of composited content, enabling a user to adjust the layout by interacting with the user interface. For example, the second computing device (e.g., compositing server(s) 106) may generate a stream of data that includes composited content such as gameplay, video data, and audio data. In some embodiments, the second remote computing device may render a user interface with different graphic design assets, user interaction data (e.g., video data and/or audio data), and the first stream of data (e.g., gameplay), which may be streamed to the client device(s) 102 as a second stream of data. The client device(s) 102 may receive input data pertaining to the user interface rendered by compositing server(s) 104. For example, the user may interact with the user interface via client device(s) 102 to adjust how data is composited in the layout, causing client device(s) 102 to receive input data with respect to the compositing application. In some embodiments, the second stream of data is transmitted as a broadcast of the live instance of the first application. In some embodiments, the second stream of data may be copied into multiple instances that are sent to other computing devices.

In some embodiments, based on the user's input data with respect to the rendered user interface, the second computing device may arrange and composite content accordingly. For instance, the second stream of data may be a composition of data (e.g., graphic design assets, user interaction data, gameplay) selected and arranged by a user. In some embodiments, the composited stream of data may be transmitted to a large number of other client devices via a broadcasting application. In some embodiments, the second stream of data may be presented to the user via one or more application window(s) 115 on client device(s) 102.

FIG. 5 is a flow diagram showing a method 500 for executing an instance of a game and compositing gameplay with other content on computing devices remote from a client device, in accordance with some embodiments of the present disclosure. The method 500, at block B502, includes receiving, using a first computing device executing a first application, a first stream of data comprising user interaction data, the user interaction data being generated using one or more sensor devices corresponding to a client device remotely located relative to the first computing device. For instance, a first computing device may be a compositing server(s) 106 that facilitates composition of different types of data for streaming. FIGS. 2A-2B provide examples of a compositing server(s) such as compositing server(s) 106A and compositing server(s) 106B, which are both remote from the client device(s) 102A-102B by virtue of being executed in the cloud. For instance, the compositing server(s) 106 may receive user interaction data from the client device(s) 102 that includes audio data and video data of the user, as captured by sensor devices corresponding to the client device(s) 102, during interaction with the gaming application. The audio and video data received by the compositing server(s) 106 may be used to composite with other data such as gameplay received from other computing devices (e.g., content streaming device(s) 104). The compositing server(s) 106 may also receive user input data with respect to a rendered user interface for compositing content (e.g., mouse clicks and keyboard strokes that rearrange content to be composited). For example, the user may adjust the position and overlay of various data in the layout, which would be transmitted as control signals to the first computing device from the client device(s) 102. The first computing device may also render a user interface of the compositing application (as a second stream of data) in order to enable a user to modify a layout showing how the content will be composited. In some embodiments, the user interface may provide a preview of what an audience receiving broadcasted content will view. The first computing device may arrange or rearrange composited content based on user input received from client device(s) 102. In some embodiments, the first computing device may use installed virtual drivers corresponding to the microphone and camera of the client device(s) 102 in order to receive inputs as local inputs.

The method 500, at block B504, includes rendering, using a second computing device executing a second application, a second stream of data comprising an output of the second application, the output of the second application being based at least in part on user input data generated using one or more user input devices corresponding to the client device. For instance, FIGS. 2A-3 provide examples of systems where a second computing device, such as a content streaming server(s) 104 and/or a compositing server(s) 106, is remote from one or more client devices. In some embodiments, the second remote computing device may be one or more virtual machines, GPUs, virtual desktops, or other computing devices, which are remote to the client device(s) 102. For example, the second computing device may be similar to content streaming server(s) 104A-104B in FIGS. 2A-2B, which is executed in the cloud remotely from the client device(s) 102A-102B. As described herein, the second remote computing device may be a content streaming server(s) 104 that executes a second application (e.g., a gaming application), renders gameplay from an instance of a game, and receives user input data from client device(s) 102. For instance, the content streaming server(s) 104 may receive, from client device(s) 102, user input data (e.g., joystick movements, keyboard data, mouse data) associated with controls available in the gaming application being executed. In some embodiments, the rendered gameplay may be generated as a second stream of data and transmitted to other computing devices (e.g., compositing server(s) 106) to composite with other content and/or to the client device(s) 102.

The method 500, at block B506, includes generating, using the first computing device, one or more third streams of data comprising a rendered composite of the first stream of data and the second stream of data. For instance, the first computing device, such as a compositing server(s) 106, may composite and render data such as gameplay, audio data, video data, and graphic design assets into a third stream of data, which may be broadcast to a larger audience.

The method 500, at block B508, includes transmitting the one or more third streams of data to one or more other client devices remotely located relative to at least one of the client device, the first computing device, or the second computing device. In some embodiments, the third stream of data may be transmitted to a broadcasting server(s) 108 to broadcast the composited content to a large public audience. The broadcasted content may include gameplay, audio data of the user, video data of the user, and/or other graphic design assets (e.g., logos, chat messages). Similarly, the third stream of data may be streamed to a first computing device (e.g., compositing server(s) 106) and/or second computing device (e.g., content streaming server(s) 104). In some embodiments, the third stream of data may be broadcast as a live instance of the first application.

Example Content Streaming System

Figure 6:
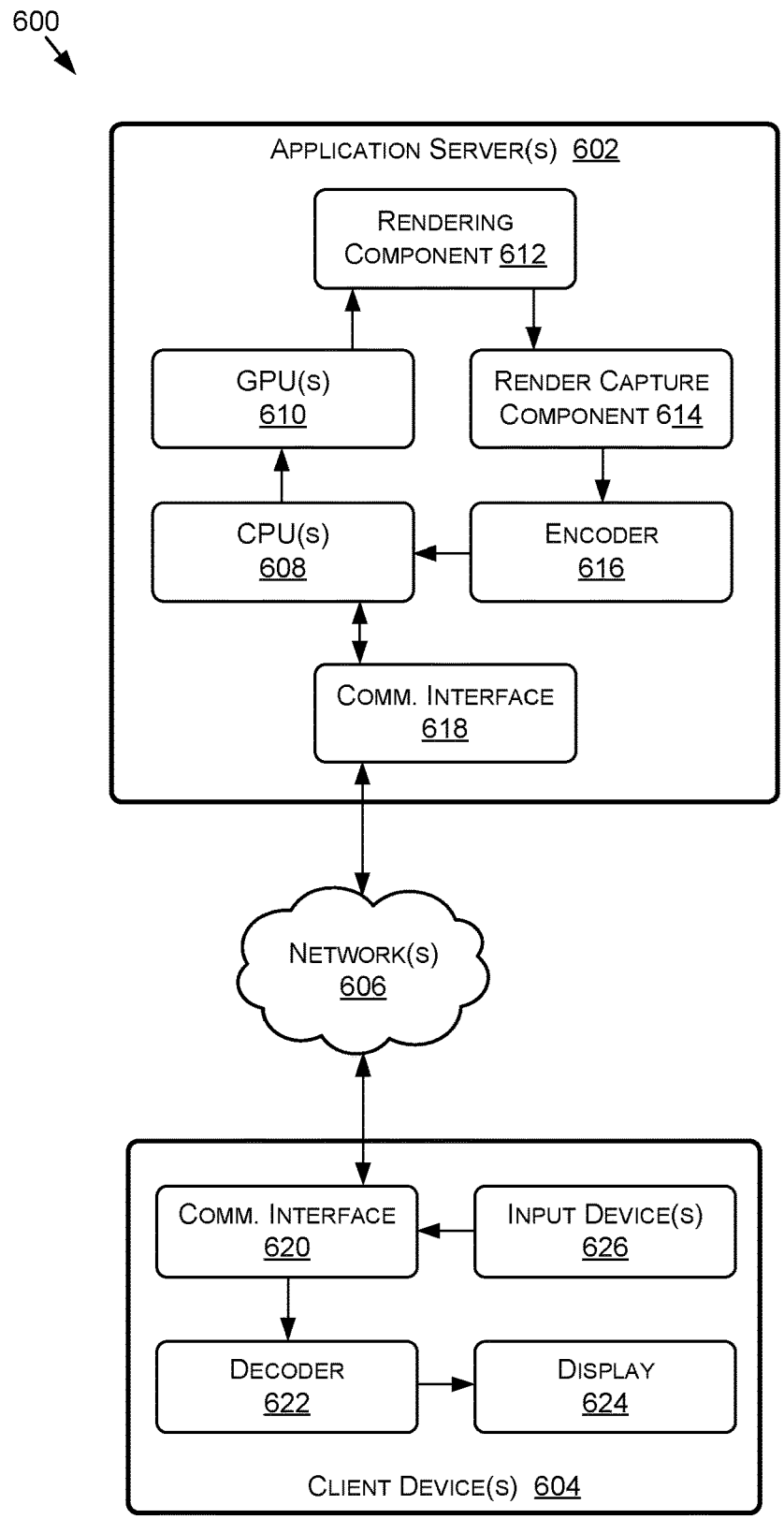
FIG. 6 is a block diagram of an example content streaming system suitable for use in implementing some embodiments of the present disclosure.

Now referring to FIG. 6, FIG. 6 is an example system diagram for a content streaming system 600, in accordance with some embodiments of the present disclosure. FIG. 6 includes application server(s) 602 (which may include similar components, features, and/or functionality to the example computing device 700 of FIG. 7), client device(s) 604 (which may include similar components, features, and/or functionality to the example computing device 700 of FIG. 7), and network(s) 606 (which may be similar to the network(s) described herein). In some embodiments of the present disclosure, the system 600 may be implemented. The application session may correspond to a game streaming application (e.g., NVIDIA GeFORCE NOW), a compositing application, a broadcasting application, a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 600, for an application session, the client device(s) 604 may only receive input data in response to inputs to the input device(s), transmit the input data to the application server(s) 602, receive encoded display data from the application server(s) 602, and display the display data on the display 624. As such, the more computationally intense computing and processing is offloaded to the application server(s) 602 (e.g., rendering—in particular ray or path tracing—for graphical output of the application session is executed by the GPU(s) of the game server(s) 602, rendering of compositing content is executed by application server(s) 602). In other words, the application session is streamed to the client device(s) 604 from the application server(s) 602, thereby reducing the requirements of the client device(s) 604 for graphics processing, composition, and rendering.

For example, with respect to an instantiation of an application session, a client device 604 may be displaying a frame of the application session on the display 624 based on receiving the display data from the application server(s) 602. The client device 604 may receive an input to one of the input device(s) and generate input data (e.g., data from a game controller with respect to the game, data from keyboard and mouse with respect to the compositing application) in response. The client device 604 may transmit the input data to the application server(s) 602 via the communication interface 620 and over the network(s) 606 (e.g., the Internet), and the application server(s) 602 may receive the input data via the communication interface 618. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 612 may render the application session (e.g., representative of the result of the input data) and the render capture component 614 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 602. In some embodiments, one or more virtual machines (VMs)—e.g., including one or more virtual components, such as vGPUs, vCPUs, etc.—may be used by the application server(s) 602 to support the application sessions. As described herein, execution of a game application and a compositing application may occur on separate computing devices (e.g., GPUs, virtual machines, virtual desktops, personal computers) on the same or different servers. The encoder 616 may then encode the display data to generate encoded display data and the encoded display data may be transmitted to the client device 604 over the network(s) 606 via the communication interface 618. The client device 604 may receive the encoded display data via the communication interface 620 and the decoder 622 may decode the encoded display data to generate the display data. The client device 604 may then display the display data via the display 624.

Example Computing Device

Figure 7:
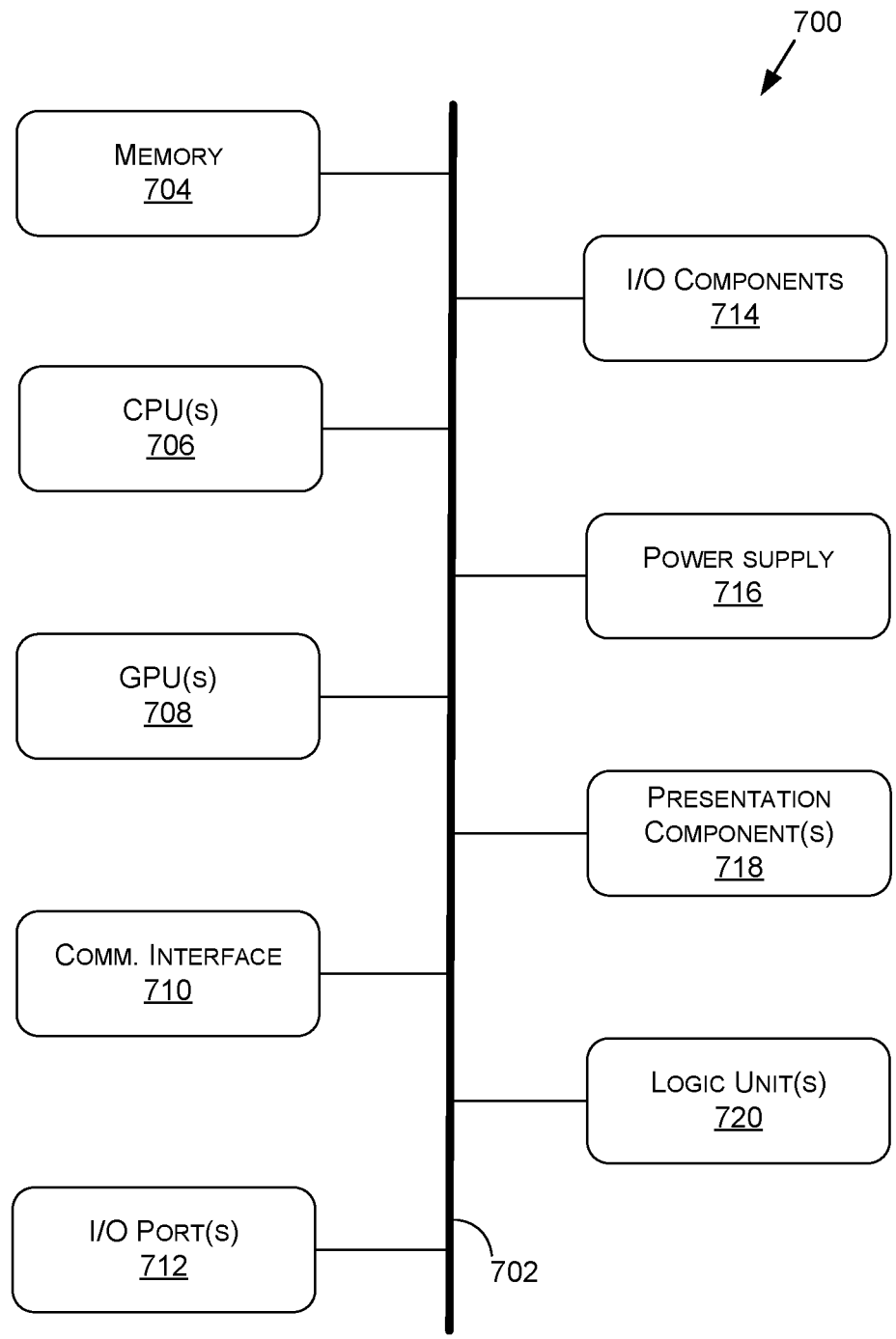
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs. In some embodiments, one or more GPUs are dedicated to executing specific tasks, such as rendering a game or compositing content. The GPUs may reside on the same or different servers in the cloud.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality. In some embodiments, the computing device 700 may install and execute virtual drivers corresponding to I/O components 714 to receive and transmit input and output data without additional configuration of an application.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
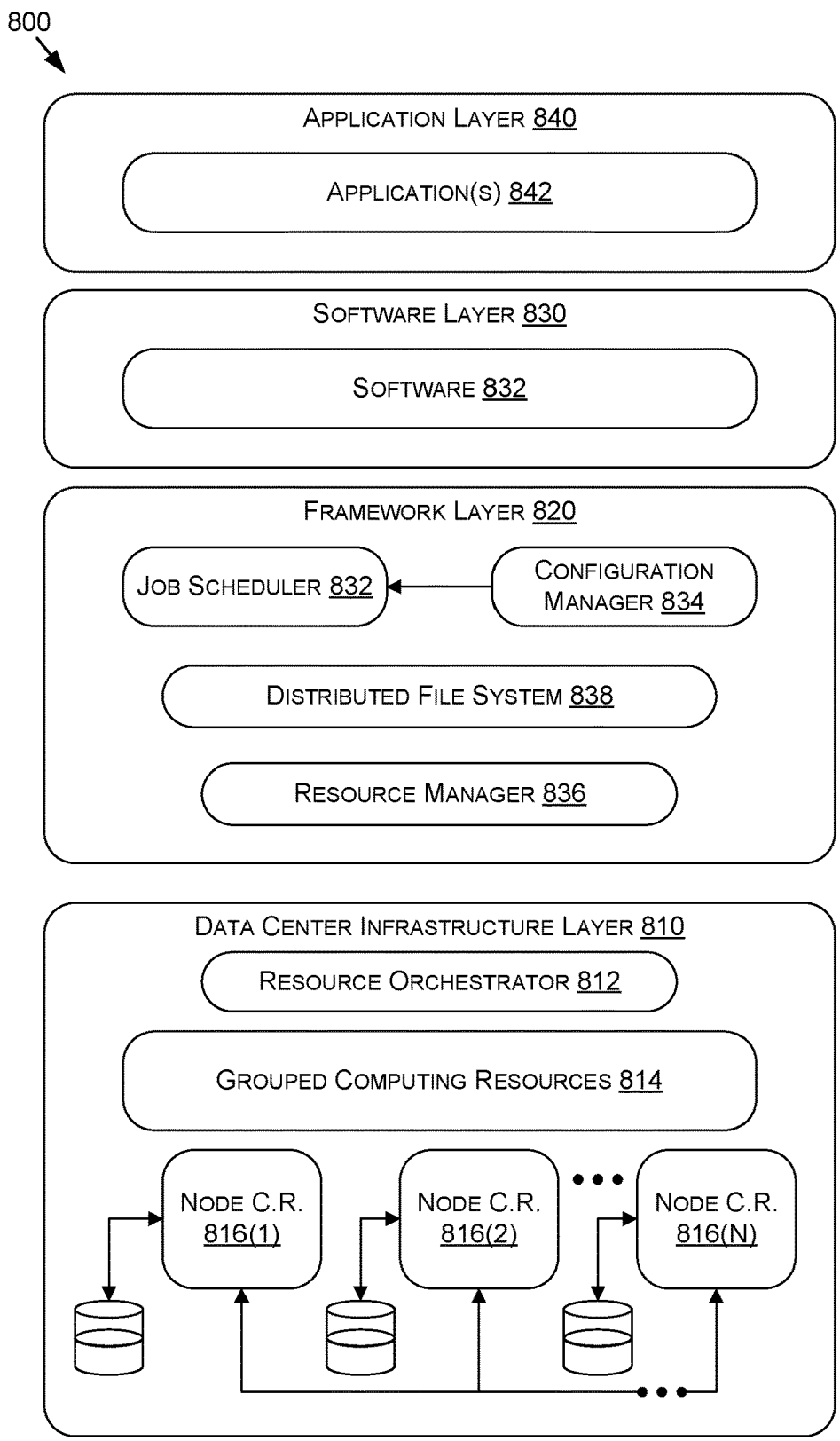
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 832, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 832. In at least one embodiment, clustered or grouped computing resources may include grouped computing resource 814 at data center infrastructure layer 810. The resource manager 836 may coordinate with resource orchestrator 812 to manage these mapped or allocated computing resources. For instance, resource manager 836 and resource orchestrator 812 may allocate computing resources (e.g., servers, GPUs, virtual machines, etc.) in the cloud to tasks such as rendering a game and executing a compositing application.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising processing circuitry to:
   generate, using a client device, first user input data corresponding to a first application, the first application being executed on a first server remotely located with respect to the client device;
   transmit, using the client device, the first user input data to cause a rendering, using the first server, of a first stream of data corresponding to the first application and responsive to the first user input data and transmitting of the first stream of data from the first server to a second server that is separate from the first server;
   generate user interaction data using one or more sensor devices proximately located with respect to the client device;
   receive, using the client device, a second stream of data including at least a render of one or more portions of a user interface of a second application executing on the second server remotely located with respect to at least one of the client device or the first server, the render being generated by the second server based at least on the user interaction data and the first stream of data received from the first server; and
   transmit, using the client device, second user input data corresponding to the render to the second server to cause a generation of one or more third streams of data comprising a rendered composite of the first stream of data, received from the first server, with the user interaction data, the rendered composite being generated at the second server using the second application and transmitted from the second server causing a broadcast of the one or more third streams of data to one or more other client devices.

2. The processor of claim 1, wherein the one or more third streams of data are streamed to the one or more other client devices by one or more broadcasting servers that are separate from the second server.

3. The processor of claim 1, wherein the first application comprises a first client application executing within a first virtual desktop on the first server and the second application comprises a second client application executing within a second virtual desktop on the second server.

4. The processor of claim 1, wherein, the first server and the second server are of a cloud computing environment.

5. The processor of claim 1, wherein a first instance of the first stream of data is streamed from the first server to the second server causing the generation of the one or more third streams of data, and a second instance of the second stream of data is streamed from the first server to the client device causing display of at least a portion of the first application at the client device.

6. The processor of claim 1, wherein the user interaction data is rendered using at least one of a virtual microphone driver or a virtual camera driver.

7. The processor of claim 1, wherein the first stream of data corresponds to a live instance of the first application, and the one or more third streams of data are transmitted as a broadcast of the live instance of the first application.

8. The processor of claim 1, wherein the render includes a preview of a screen included in the rendered composite.

9. The processor of claim 1, wherein the user interaction data comprises at least one of audio data generated using a camera device.

10. The processor of claim 1, wherein the first application comprises a gaming application and the second application comprises a video composite application.

11. The processor of claim 1, wherein the processor is further to:
    receive, using the client device, the second user input data corresponding to a configuration of a display of at least one of the first stream of data or the user interaction data in the one or more third streams of data, the second user input data causing the second application to reconfigure a rendering of the at least one of the first stream of data or the user interaction data in the one or more third streams of data.

12. A method comprising:
    receiving, using a first server executing a first application, a first stream of data comprising user interaction data, the user interaction data being generated using one or more sensor devices corresponding to a client device remotely located relative to the first server;
    transmitting, to the client device, a second stream of data including at least a render of one or more portions of a user interface of the first application, the render being generated by the first server based at least on the user interaction data;

rendering, using a second server that is separate from the first server and is executing a second application, a third stream of data comprising an output of the second application, the output of the second application being based at least on first user input data generated using one or more user input devices corresponding to the client device;

generating, using the first server, one or more fourth streams of data comprising a rendered composite of the first stream of data and the third stream of data, received from the second server, based at least on second user input data generated using the client device and corresponding to the render; and transmitting the one or more fourth streams of data, the transmitting causing a broadcast to one or more other client devices remotely located relative to at least one of the client device, the first server, or the second server.

13. The method of claim 12, wherein the one or more fourth streams of data are transmitted to the one or more other client devices by a third server remotely located with respect to the client device.

14. The method of claim 12, wherein the first application corresponds to a first virtual machine (VM) and the second application corresponds to a second VM.

15. The method of claim 14, wherein the render corresponds to a virtual desktop of the first VM.

16. The method of claim 12, wherein the first server includes a first graphics processing unit (GPU) and the second server includes a second GPU that is higher power than the first GPU.

17. The method of claim 12, wherein the generating the one or more fourth streams of data comprises rendering the user interaction data using at least one of a virtual microphone driver corresponding to the first server or a virtual camera driver corresponding to the first server.

18. The method of claim 12, wherein transmitting the one or more fourth streams of data comprises broadcasting the third stream of data as a live instance of the first application.

19. The method of claim 12, wherein the one or more sensor devices comprises at least one of:
a microphone device; or
a camera device.

20. The method of claim 19, wherein the user interaction data comprises at least one of audio data generated using the microphone device or image data generated using the camera device.

21. The method of claim 12, wherein the first application comprises a video composite application and the second application comprises a gaming application.

22. The method of claim 12, wherein the method further comprises:
receiving third user input data corresponding to a configuration of a display of at least one of the first stream of data or the third stream of data in the rendered composite;

generating, using the first server, one or more fifth streams of data comprising a re-rendered composite of the first stream of data and the third stream of data, the re-rendered composite corresponding to the third user input data; and transmitting the one or more fifth streams of data instead of the one or more fourth streams of data to the one or more other client devices.

23. A system comprising:
one or more processing units to execute operations comprising:
receiving, at a client device, a first instance of a first stream of data corresponding to an instance of a game within an instance of a gaming application, the first stream of data being rendered by a first server remotely located with respect to the client device;

generating, at the client device, data including at least one of audio data generated using a microphone of the client device or image data generated using a camera of the client device;

transmitting, by the client device, the data to a second server remotely located with respect to the client device and separate from the first server;

receiving, at the client device, a second stream of data including at least a render of one or more portions of a user interface of an instance of a compositing application, the render being generated by the second server using the data;

receiving, at the client device, input data representative of one or more inputs to one or more input devices of the client device, the one or more inputs corresponding to the render; and transmitting, by the client device, the input data to the second server to cause, at least in part, the second server to generate one or more third streams of data based at least on the data, the input data, and a second instance of the first stream of data received by the second serve from the first server, and causing a broadcast of the one or more third streams of data to one or more other client devices.

24. The system of claim 23, wherein the one or more third streams of data are streamed to the one or more other client devices by a third server.

25. The system of claim 23, wherein the first server and the second server correspond to a cloud computing environment.

26. The system of claim 25, wherein the render corresponds to a virtual desktop of the first VM.

27. The system of claim 23, wherein the system is comprised in at least one of:
a system for performing deep learning operations;
a system implemented using an edge device;
a system incorporating one or more virtual machines (VMs);
a system implemented at least partially in a data center; or
a system implemented at least partially using cloud computing resources.

* * * * *